United States Patent [19]
Fukushima et al.

[11] Patent Number: 5,318,847
[45] Date of Patent: Jun. 7, 1994

[54] CARBODIIMIDE TREATED CARBON FIBER AND USE THEREOF

[75] Inventors: Toshiharu Fukushima; Masuhiro Okada; Kaoru Yoshioka, all of Hamamatsu, Japan

[73] Assignee: Yamaha Corporation, Japan

[21] Appl. No.: 959,773

[22] Filed: Oct. 13, 1992

[30] Foreign Application Priority Data

Oct. 11, 1991 [JP] Japan .................. 3-292541
Nov. 7, 1991 [JP] Japan .................. 3-291781
Nov. 8, 1991 [JP] Japan .................. 3-293432

[51] Int. Cl.$^5$ .................. B32B 9/00; D02G 3/00
[52] U.S. Cl. .................. 428/392; 428/408; 523/200; 523/204
[58] Field of Search ............ 523/200, 204; 525/467; 428/392, 408

[56] References Cited

U.S. PATENT DOCUMENTS

3,635,878  1/1972  Gebura et al. .................. 260/40 R
4,929,665  5/1990  Inoue et al. .................. 524/500

FOREIGN PATENT DOCUMENTS

2268838  4/1974  France .

OTHER PUBLICATIONS

Databse WPIL Derwent Publications AN 88225063[32] & JP-A-63 161 027 (Jul. 1988).
Database WPIL Derwent Publications AN 84221833[36] & JP-A-59 129 253.

*Primary Examiner*—Paul R. Michl
*Assistant Examiner*—U. K. Rajguru
*Attorney, Agent, or Firm*—Ostrolenk, Faber, Gerb & Soffen

[57] ABSTRACT

The present invention provides a carbon-fiber reinforced thermoplastic resin (CFRTP) having excellent adhesion between a carbon fiber, used therein as a reinforcing material, and a thermoplastic resin, used therein as a matrix. A carbodiimide agent is employed in order to achieve the above object. By the present invention, the carbodiimide agent is adhered to a carbon fiber for a reinforcing material, and the thus-treated carbon fiber is combined with a matrix thermoplastic resin; or the carbodiimide agent is mixed with a matrix thermoplastic resin, and the mixture is combined with a carbon fiber for a reinforcing material. The carbodiimide agent enhances adhesion between the carbon fiber and the matrix thermoplastic resin. Accordingly, superior mechanical properties of the carbon fiber is sufficiently exploited in the CFRTP produced according to the present invention; therefore, the CFRTP of the present invention is an excellent composite material having superior mechanical strength.

15 Claims, 4 Drawing Sheets

CARBODIIMIDE TREATED CARBON FIBER AND USE THEREOF

BACKGROUND OF THE INVENTION

1. Field of the Invention

The present invention relates to a carbon-fiber reinforced thermoplastic resin (hereinafter referred to as CFRTP), to a carbon fiber for use in the CFRTP as a reinforcing material, to a thermoplastic resin for use in the CFRTP as a matrix, and to a prepreg (preimpregnated material) for use in producing the CFRTP. A carbodiimide agent is employed in the present invention in order to enhance adhesion between the carbon fiber and the thermoplastic resin.

2. Description of the Prior Art

For production of CFRTPs, there are known methods for improving adhesion between a carbon fiber which is a component as a reinforcing material and a thermoplastic resin which is a matrix component. Such methods include, for example: coating the surface of the carbon fiber with polyvinylpyrrolidone (disclosed by Japanese Patent Application First Publication No. Sho 57-56586); coating the surface of the carbon fiber with polyurethane resin (disclosed by Japanese Patent Application First Publication No. Sho 58-126375); coating the surface of the carbon fiber with acrylonitrile-styrene copolymer resin (disclosed by Japanese Patent Application First Publication No. Sho 59-71478); sizing the surface of the carbon fiber with polyetherimide resin (disclosed by Japanese Patent Application First Publication No, Sho 62-299580).

However, the excellent mechanical properties of the carbon fiber have not been satisfactorily exploited in the CFRTPs, as the improvement in adhesion between the carbon fiber and the thermoplastic resin as the matrix was not sufficient according to the prior methods, and therefore, mechanical strength of these CFRTPs was inferior compared to that of carbon-fiber reinforced plastics (CFRPs) which use thermosetting resin as a matrix.

SUMMARY OF THE INVENTION

The object of the present invention is to provide a CFRTP having excellent adhesion between a carbon fiber, used therein as a reinforcing material, and a thermoplastic resin, used therein as a matrix.

The above object is achieved by employing a carbodiimide agent in order to enhance adhesion between the carbon fiber and the thermoplastic resin.

To be more precise, there is provided a method for achieving the above object according to the present invention, whereby a carbodiimide agent or a mixture of a carbodiimide agent and a surface-coating thermoplastic resin is employed as a surface-coating agent, the surface-coating agent is adhered to a carbon fiber for a reinforcing material, and the thus-treated carbon fiber is combined with a matrix thermoplastic resin.

There is also provided another method for achieving the above object according to the present invention, whereby a carbodiimide agent is mixed with a matrix thermoplastic resin, and the mixture is combined with a carbon fiber for a reinforcing material.

By the use of the carbodiimide agent, the CFRTP produced according to the present invention shows improved adhesion between the carbon fiber, employed in the CFRTP as the reinforcing material, and the thermoplastic resin, employed in the CFRTP as the matrix.

Furthermore, the secondly-described method of the present invention provides even better work efficiency and lower cost for production, by allowing the use of fewer work steps than the firstly-described method whereby the carbon fiber treated with the carbodiimide agent is combined with the matrix thermoplastic resin.

DETAILED DESCRIPTION OF THE PREFERRED EMBODIMENTS

Figure 1:
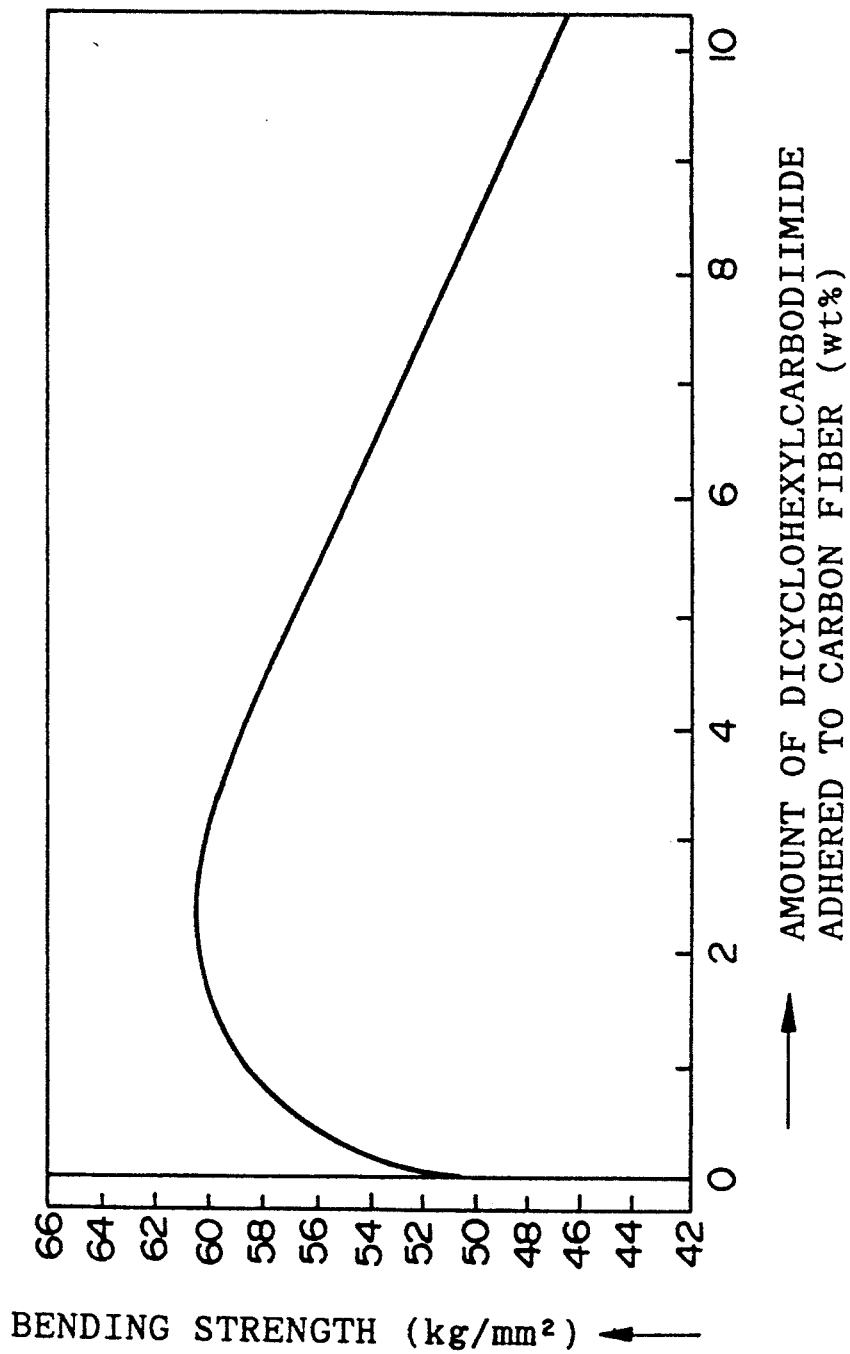
FIG. 1 is a graph showing the results of Example 1.

The present invention is described in detail in the following.

A carbodiimide agent (often simply called a "carbodiimide") is a compound having a structure as shown in the following general formula (I):

$$R_1-N=C=N-R_2 \qquad (I)$$

(wherein $R_1$ and $R_2$ are selected from a group consisting of an alicyclic substituent, such as cyclohexyl; an aliphatic substituent, such as ethyl, methyl, and isopropyl; an aromatic substituent, such as p-toluoyl. $R_1$ and $R_2$ may be the same or different.)

The carbodiimide agent may be selected from, for example, dicyclohexylcarbodiimide, di-p-toluoylcarbodiimide, diisopropylcarbodiimide, and diphenylcarbodiimide.

Material for the thermoplastic resin to be employed as a matrix in the present invention is not particularly specified; however, preferred materials are, for example, polycarbonate resin, polyamide resin, polyoxymethylene resin, polyethyleneterephthalate resin, polybutyleneterephthalate resin, polyetheretherketone resin, polyetherketone resin, polyphenylenesulfide resin, and polyphenyleneoxide resin. Polycarbonate resin is particularly preferred.

The carbon fiber to be employed as a reinforcing material in the present invention may be a carbon fiber having high elasticity and strength, such as an acrylonitrile fiber, a rayon, and a pitch; which may be formed into a monofilament, a strand, a roving, a chopped strand, a chopped strand mat, a roving cloth, a plain-woven cloth, a satin woven cloth.

Since an ordinary roving or strand on the market is coated with a sizing agent (binder), it is preferred to burn the carbon fiber to remove the sizing agent before us of the carbon fiber by heating at a high temperature in air.

Furthermore, a surface-activation treatment may be applied to the carbon fiber. The surface-activation treatment may be chosen from various treatment processes such as a treatment utilizing potassium permanganate or nitric acid, and an electrolytic treatment in an electrolytic solution.

The firstly-described method for enhancing adhesion between the carbon fiber and the thermoplastic resin by employing the carbodiimide agent according to the present invention is implemented by adhering the carbodiimide agent to the carbon fiber as a component of a surface-coating agent. As the surface-coating agent, the carbodiimide agent may be employed alone, or a mixture of the carbodiimide agent and a surface-coating thermoplastic resin may be employed.

Material for the surface-coating thermoplastic resin is not particularly specified; however, it may preferably be of the same type as the thermoplastic resin to be used as the matrix to form the CFRTP by being combined with the thus-surface-coated carbon fiber for the reinforcing material; polycarbonate resin is particularly preferred.

A process for adhering the surface-coating agent onto the carbon fiber comprises the steps of preparing a surface-coating agent solution by dissolving the carbodiimide agent or the mixture of the carbodiimide agent and the surface-coating thermoplastic resin in an organic solvent, dipping the carbon fiber in the surface-coating agent solution, and removing the organic solvent by drying and volatilizing it. A process by way of spraying the surface-coating solution onto the carbon fiber or a process by way of coating the surface-coating agent solution on the carbon fiber by using a curtain coater, is also adoptable.

The organic solvent is not particularly specified, unless the organic solvent denatures or degrades the surface-coating agent; however, dichloromethane or trichloromethane is preferably employed.

In order to adhere sufficient amounts of the surface-coating agent onto the carbon fiber by dipping once into the surface-coating agent solution, the concentration-by-weight ratio of the surface-coating agent in the solution may be within a range between 0.01% and 10%, and preferably within a range between 0.1% and 7%; however the effects of the present invention may be obtained outside of these ranges.

The amount-by-weight ratio of the carbodiimide agent adhered to the carbon fiber after drying may be chosen within a range between 0.001% and 8%, and preferably within a range between 0.1% and 7%. When the amount of the carbodiimide agent on the carbon fiber is less than 0.001%, adhesion between the carbon fiber and the matrix thermoplastic resin is not substantially improved. When the amount of the carbodiimide agent on the carbon fiber is more than 8%, an excess of the surface-coating agent adversely affects adhesion between the carbon fiber and the matrix thermoplastic resin.

In the case where the mixture of the carbodiimide agent and the surface-coating thermoplastic resin is employed as the surface-coating agent, the amount-by-weight ratio of the surface-coating thermoplastic resin adhered to the carbon fiber after drying may be within a range between 0.1% and 10%, in addition to the amount of the carbodiimide agent on the carbon fiber being in the above ranges. When the amount of the surface-coating thermoplastic resin on the carbon fiber is less than 0.1%, adhesion between the carbon fiber and the matrix thermoplastic resin is not substantially improved, since the amount of the carbodiimide agent in the surface-coating agent becomes insufficient. When the amount of the surface-coating thermoplastic resin on the carbon fiber is more than 10%, which is in excesses of the proper amount, the surface-coated carbon fiber loses flexibility as a fiber and the surface-coated carbon fiber itself becomes like a prepreg.

The carbon fiber, which is surface-coated, as explained above, by the carbodiimide agent or the mixture of the carbodiimide agent and the surface-coating thermoplastic resin, is dispersed as the reinforcing material in the matrix thermoplastic resin, and the surface-coated carbon fiber and the matrix thermoplastic resin are combined so as to form the prepreg or the CFRTP in accordance with the firstly-described method of the present invention.

The secondly-described method for enhancing adhesion between the carbon fiber and the thermoplastic resin by employing the carbodiimide agent according to the present invention is implemented by mixing the carbodiimide agent with the matrix thermoplastic resin.

A process for mixing the carbodiimide agent with the matrix thermoplastic resin may be chosen from various processes, such as a dry-process comprising the steps of adding the carbodiimide agent (in the form of a powder, a solution, or a melted form) to the thermoplastic resin (in the form of a powder or a pellet), and mixing the carbodiimide agent and the thermoplastic resin by means of a mixer such as a high-speed mixer; or kneading the carbodiimide agent and the thermoplastic resin, and pelletizing.

When the thermoplastic resin is comparatively highly soluble in organic solvents, a wet-process may be employed for mixing the carbodiimide agent with the matrix thermoplastic resin. The wet-process may include the step of dissolving the thermoplastic resin and the carbodiimide agent in a mutual solvent thereof in order to form a resin solution; or further include the step of removing the mutual solvent by evaporating it in order to form the resin into powder or solid.

Another process for mixing the carbodiimide agent with the matrix thermoplastic resin may be employed, which includes the steps of adding the carbodiimide agent to the thermoplastic resin in melted form and mixing this melted substance.

The amount of the carbodiimide agent mixed in the thermoplastic resin is within a range between 0.1 wt % and 10 wt %, preferably within a range between 0.5 wt % and 8 wt %, and more preferably within a range between 1 wt % and 5 wt %. When the amount of the added carbodiimide agent is less than 0.1 wt %, the effect of the addition of the carbodiimide agent is not obtained. When the amount of the carbodiimide agent is more than 10 wt %, the bending strength of the produced CFRTP deteriorates.

The thermoplastic resin thus-mixed with the carbodiimide agent is combined with the carbon fiber, so as to form the prepreg or the CFRTP in accordance with the secondly-described method of the present invention.

In the firstly-described method and the secondly-described method, a process for combining the matrix thermoplastic resin and the carbon fiber may be chosen from various processes such as a process comprising the steps of chopping a carbon fiber strand to form a chopped strand, mixing the chopped strand with a thermoplastic resin in the form of a powder or a pellet, kneading the mixture in an extruder, and immediately thereafter molding an article; a process comprising the steps of kneading the mixture in an extruder to form a mixture pellet, and molding an article by injection-molding or extrusion-molding the mixture pellet; a process comprising the steps of laminating alternately a thermoplastic resin (in the form of a film, a sheet, a woven cloth, or a non-woven cloth) and a carbon fiber mat or cloth, and integrating the laminated substance by heating and pressing to mold an article; a process comprising the steps of sprinkling a thermoplastic resin in powder form on a carbon fiber mat or cloth, impregnating the carbon fiber with the thermoplastic resin by heating to form a prepreg; a process comprising the step of impregnating the carbon fiber mat or cloth with a melted thermoplastic resin to form a prepreg; and a process, further to the above-described processes for forming the prepreg, comprising the step of molding an article using the prepreg.

The content-by-volume ratio of the carbon fiber in the thus-obtained molded CFRTP article may be within a range between 30% and 65% in order to obtain preferable strength; however, the content of the carbon fiber may be outside of this range according to the use of the CFRTP and other conditions.

The CFRTP produced according to the present invention as explained above has superior improved adhesion between the carbon fiber and the matrix thermoplastic resin, since the carbodiimide agent is adhered to the carbon fiber or is mixed in the matrix thermoplastic resin.

To be more precise, superior mechanical properties of the carbon fiber is sufficiently exploited in the CFRTP produced according to the present invention; therefore, the CFRTP of the present invention is an excellent composite material having superior mechanical strength.

In addition, the secondly-described method of the present invention provides even better work efficiency and lower production cost, by requiring fewer work steps than the firstly-described method whereby the carbon fiber treated with the carbodiimide agent is combined with the matrix thermoplastic resin.

Examples

Examples of the present invention are described below so as to explicitly describe the actions and effects of the present invention. Examples of the firstly-described method for producing the CFRTP according to the present invention are described in Examples 1 and 2. An example of the secondly-described method for producing the CFRTP according to the present invention is described in Example 3.

EXAMPLE 1

1-1 Surface-coating of Carbon Fiber

"Torayca Cloth C06343" (a plain-woven cloth having a basis weight of 198 g/m$^2$; a product of Toray Industries, Inc.), employed as the carbon fiber, was heated in an electric kiln at a temperature of 400° C. for 25 minutes in order to burn and remove the sizing agent on the carbon fiber.

Dicyclohexylcarbodiimide, employed as the carbodiimide agent, was dissolved in dichloromethane solvent, and thus carbodiimide agent solutions in various concentrations were prepared.

Pieces of carbon fiber cloth, heat-treated as above, were each dipped into one of the carbodiimide agent solutions of different concentrations at room temperature for 10 minutes, and then dried in a range of temperatures between 40° C. and 50° C. for 5 minutes in order to volatilize the dichloromethane.

The amount of dicyclohexylcarbodiimide adhered to the carbon fiber was evaluated according to the difference between the weights of the carbon fiber before and after dipping and drying.

1-2 Molding CFRTP

Cloth whereinto polycarbonate fiber is woven (having a basis weight of 100g/m$^2$; a product of Teijin Limited) was employed as the matrix thermoplastic resin.

A CFRTP molded article in the form of a plate was obtained by laminating several times alternately the polycarbonate fiber cloth and the carbon fiber cloth coated with the carbodiimide agent, and heating and pressing by a press machine.

The fibers in a piece of carbon fiber cloth were laminated so as to cross at right angles the fibers of an alternating piece of carbon fiber cloth in order to form a 0°–90° bidirectionally reinforced article. The content of the carbon fiber ($V_f$) in the molded article was controlled to be 50 vol %. The conditions for the heating and pressing were at a temperature of 250° C. at a pressure of 15 kgf/cm2 for a duration of 10 minutes.

1-3 Evaluation of Properties

The properties of the CFRTP molded articles in the form of the plate obtained as described above were evaluated by a three-point bending test. The testing conditions were as follows:

| Size of Test Piece: | |
|---|---|
| (width) | 25.4 mm |
| (length) | 60 mm |
| (thickness) | 2 mm |
| Distance between Supporting Points: | 40 mm |
| Radius of Curvature at the top of Loading Point: | 3 mm |
| Test Speed: | 1 mm/min |
| Number of Samples: | no less than 10 |

The result of the test is shown in FIG. 1

In the graph in FIG. 1, the amount of the dicyclohexylcarbodiimide (in wt %) is plotted on the abscissa, and the bending strength (in kg/mm$^2$) is plotted on the ordinate.

From the graph in FIG. 1, it is apparent that the CFRTP molded article produced by using the carbon fiber whereto the dicyclohexylcarbodiimide was adhered had superior bending strength due to improvement in adhesion between the carbon fiber and the polycarbonate resin. Furthermore, the graph shows that the adhesion between the carbon fiber and the polycarbonate resin deteriorated when the amount of the dicyclohexylcarbodiimide exceeded 8 wt %.

Figure 2:
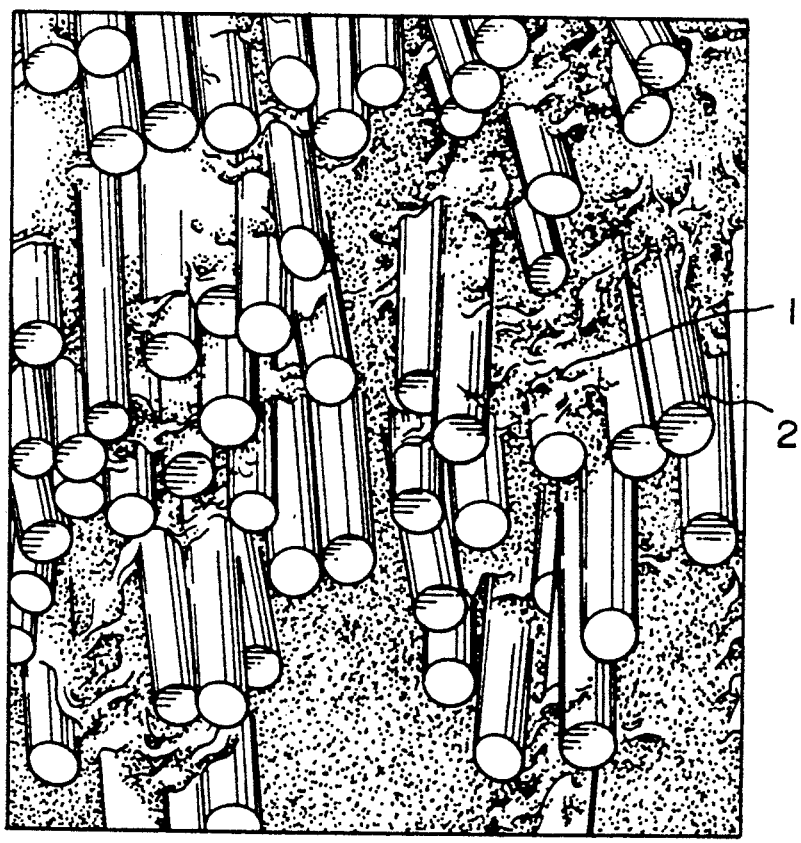
FIG. 2 is a drawing showing a broken view of an electron-microphotograph of a test piece of Example 1, showing the fibrous constitution of the carbon fibers.

FIG. 2 shows a broken view (1000 magnification) of a scanning-electron-microphotograph of a test piece after the bending test for this example was performed, wherein the carbon fiber coated with dicyclohexylcarbodiimide was employed in the CFRTP test piece. This microphotographic view shows the condition of cohesive failure, wherein polycarbonate 1 is adhered to the surface of carbon fiber monofilament 2.

COMPARATIVE EXAMPLE 1

A CFRTP obtained in Example 1, by using the carbon fiber whereon the amount of dicyclohexylcarbodiimide was 0 wt %, is a comparative example of the CFRTP molded article. In the production of the CFRTP of this comparative example, a carbon fiber cloth (to be used in the CFRTP) from which the sizing agent was removed by heating was immediately thereafter combined with the polycarbonate resin. The bending strength of the test piece of this comparative example was 50.2 kg/mm$^2$.

Figure 3:
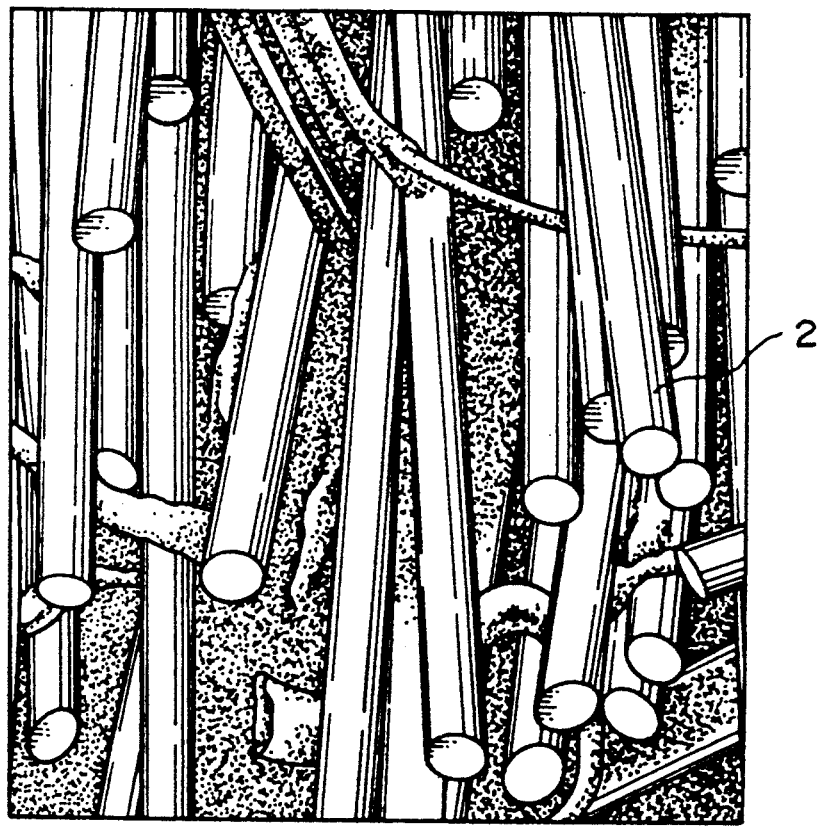
FIG. 3 is a drawing showing a broken view of an electron-microphotograph of a test piece of Comparative Example 1, showing the fibrous constitution of the carbon fibers.

FIG. 3 shows a broken view (1000 magnification) of a scanning-electron-microphotograph of a test piece after the bending test for this comparative example was performed, wherein the carbon fiber without coating of dicyclohexylcarbodiimide was employed in the CFRTP test piece. This microphotographic view shows the condition of interface failure, wherein polycarbonate does not remain on the surface of carbon fiber monofilament 2.

By comparison of FIG. 2 and FIG. 3, it is concluded that there was an effect of surface-coating by using dicyclohexylcarbodiimide in Example 1.

EXAMPLE 2

2-1 Surface-coating of Carbon Fiber

"Torayca Cloth C06343" (a plain-woven cloth having a basis weight of 198 g/m$^2$; a product of Toray Industries, Inc.), employed as the carbon fiber, was heated in an electric kiln at a temperature of 400° C. for 25 minutes in order to burn and remove the sizing agent on the carbon fiber.

Dicyclohexylcarbodiimide, employed as the carbodiimide agent, and polycarbonate resin, employed as the surface-coating thermoplastic resin, were dissolved in dichloromethane solvent to prepare a solution of a mixture of the carbodiimide agent and the surface-coating thermoplastic resin (wherein the concentration of the dicyclohexylcarbodiimide was 2.4 wt %; and the concentration of the polycarbonate resin was 1.2 wt %).

The carbon fiber cloth as heat-treated above was dipped in the carbodiimide agent solution at room temperature for 10 minutes, and then dried at a range of temperatures between 40° C. and 50° C. for 5 minutes in order to volatilize the dichloromethane.

2-2 Molding CFRTP

Cloth whereinto polycarbonate fiber is woven (having a basis weight of 100g/m$^2$; a product of Teijin Limited) was employed as the matrix thermoplastic resin.

A CFRTP molded article in the form of a plate was obtained by laminating several times alternately the polycarbonate fiber cloth and the carbon fiber cloth (coated with the mixture of the carbodiimide agent and the surface-coating thermoplastic resin), and heating and pressing by a press machine.

The fibers in a piece of carbon fiber cloth were laminated so as to cross at right angles the fibers of an alternating piece of carbon fiber cloth in order to form a 0°–90° bidirectionally reinforced article. The content of the carbon fiber (V$_f$) in the molded article was controlled to be 50 vol % The conditions for the heating and pressing were at a temperature of 250° C. at a pressure of 15 kgf/cm$^2$ for a duration of 10 minutes.

2-3 Evaluation of Properties

The properties of the CFRTP molded article in the form of a plate obtained as described above were evaluated by a three-point bending test. The testing conditions were as follows:

| Size of Test Piece: | |
|---|---|
| (width) | 25.4 mm |
| (length) | 60 mm |
| (thickness) | 2 mm |
| Distance between Supporting Points: 40 mm | |
| Radius of Curvature at the top of Loading Point: 3 mm | |
| Test Speed: 1 mm/min | |
| Number of Samples: no less than 10 | |

As the result of the bending test, the bending strength of the CFRTP obtained according to this example was 63.6 kg/mm$^2$.

COMPARATIVE EXAMPLE 2

A CFRTP molded article in the form of a plate similar to the form of the CFRTP molded article in Example 1 was produced by heat-treating a carbon fiber cloth as described in Example 1, impregnating the carbon fiber cloth with a polycarbonate solution (wherein the concentration of the polycarbonate was 5.0 wt %), and heating to dryness. The bending strength of this CFRTP molded article was 54.1 kg/m$^2$.

The result shows that the CFRTP molded article produced by using the carbon fiber to which the mixture of the dicyclohexylcarbodiimide and the polycarbonate was adhered had superior bending strength due to improvement in adhesion between the carbon fiber and the polycarbonate resin for the matrix.

EXAMPLE 3

3-1 Surface-treatment of Carbon Fiber and Preparation of Matrix Mixture Solutions Pieces of "Torayca Cloth C06343" (a plain-woven cloth having a basis weight of 198 g/m$^2$; a product of Toray Industries, Inc.), employed as the carbon fiber, were heated in an electric kiln at a temperature of 400° C. for 25 minutes in order to burn and remove the sizing agent on the carbon fiber.

Twenty five grams of polycarbonate resin powder "Panlite 1250WJ" (a test product of Teijin Limited) were dissolved in 75 grams of dichloromethane to prepare a resin solution having a resin concentration of 25 wt %. Dicyclohexylcarbodiimide in various amounts was added and dissolved in the resin solutions to prepare a mixture solutions.

3-2 Preparation of Prepreg and Molding CFRTP

Pieces of impregnation prepreg were prepared by dipping each piece of the above carbon fiber cloth (sized 30 cm × 30 cm) into one of the mixture solutions, impregnating each pieces of the carbon fiber cloth with the mixture solutions, and volatilizing the dichloromethane on a hot plate at 40° C. The impregnation prepreg was further vacuum-dried for one day at 80° C.

Nine pieces of the impregnation prepreg were laminated in such a manner that the fibers in a piece of the impregnation prepreg crossed at right angles to those of an alternating piece of the impregnation prepreg, and the nine pieces were heated and pressed by a press machine in order to form a 0°–90° bidirectionally reinforced molded CFRTP article in the form of a plate. The content of the carbon fiber (V$_f$) in the molded article was controlled to be 50 vol %. The conditions for the heating and pressing were at a temperature of 250° C., at a pressure of 15 kgf/cm$^2$, and for a duration of 10 minutes.

3-3 Evaluation of Properties

The properties of the CFRTP molded articles in the form of a plate obtained as described above were evaluated by a three-point bending test. The testing conditions were as follows:

| Size of Test Piece: | |
|---|---|
| (width) | 25.4 mm |
| (length) | 60 mm |
| (thickness) | 2 mm |
| Distance between Supporting Points: 40 mm | |
| Radius of Curvature at the top of Loading Point: 3 mm | |
| Test Speed: 1 mm/min | |
| Number of Samples: no less than 10 | |

Figure 4:
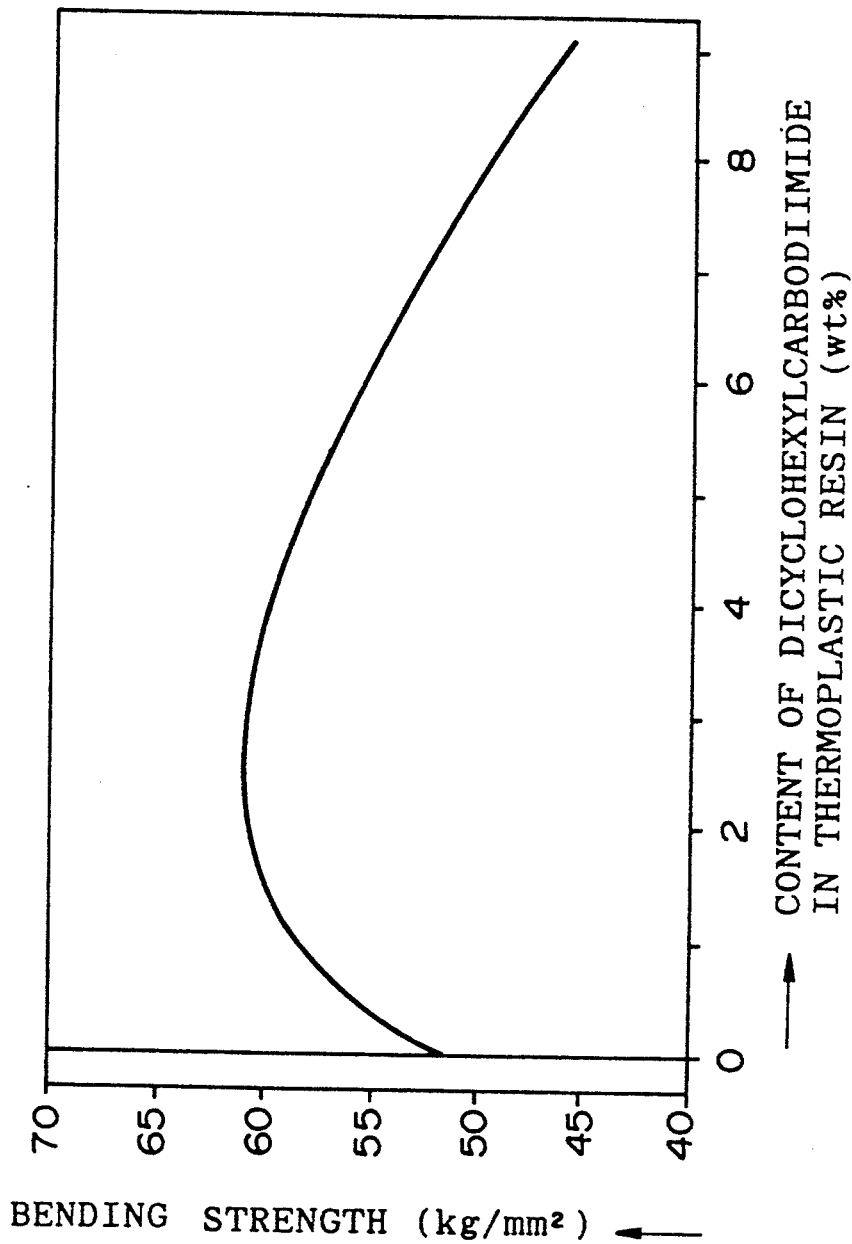
FIG. 4 is a graph showing the result of Example 3.

The result of the test is shown in FIG. 4

In the graph in FIG. 4, the content of the dicyclohexylcarbodiimide (in wt %) in the thermoplastic resin is plotted on the abscissa, and the bending strength (in $kg/mm^2$) is plotted on the ordinate. Where the content of the dicyclohexylcarbodiimide is 0 wt %, the graph indicates the bending strength of the molded CFRTP article produced by using the polycarbonate resin solution dissolving no dicyclohexylcarbodiimide.

From the graph in FIG. 4, it is apparent that the CFRTP molded article produced by using the mixture of the dicyclohexylcarbodiimide and the polycarbonate resin for matrix had superior bending strength due to improvement in adhesion between the carbon fiber and the polycarbonate resin. Furthermore, the graph shows that the adhesion between the carbon fiber and the polycarbonate resin deteriorated when the amount of the dicyclohexylcarbodiimide exceeded 8 wt %.

What is claimed is:

1. A carbon fiber composition comprising a carbon fiber and a carbodiimide agent, said carbodiimide agent adhering to the surface of said carbon fiber.

2. A carbon fiber reinforced thermoplastic resin comprising a carbon fiber composition according to claim 1 and a thermoplastic resin, said carbon fiber composition comprising a carbon fiber and a carbodiimide agent, said carbodiimide agent adhering to the surface of said carbon fiber.

3. A prepreg comprising a carbon fiber composition and a thermoplastic resin, said carbon fiber composition according to claim 1 comprising a carbon fiber and a carbodiimide agent, said carbodiimide agent adhering to the surface of said carbon fiber, said carbon fiber composition impregnated with said thermoplastic resin.

4. A carbon fiber composition comprising a carbon fiber and a mixture comprising a surface-coating thermoplastic resin and a carbodiimide agent, said mixture adhering to the surface of said carbon fiber.

5. A carbon-fiber reinforced thermoplastic resin comprising a carbon fiber composition according to claim 1 and a thermoplastic resin, said carbon fiber composition comprising a carbon fiber and a mixture comprising a surface-coating thermoplastic resin and a carbodiimide agent, said mixture adhering to the surface of said carbon fiber.

6. A prepreg comprising a carbon fiber composition according to claim 1 and a thermoplastic resin, said carbon fiber composition comprising a carbon fiber and a mixture comprising a surface-coating thermoplastic resin and a carbodiimide agent, said mixture adhering to the surface of said carbon fiber, said carbon fiber composition impregnated with said thermoplastic resin.

7. A thermoplastic resin composition for use in a carbon fiber reinforced thermoplstic resin, said thermoplastic resin composition consisting essentially of a polycarbonate thermoplastic resin and between 0.1-10 weight % of a carbodiimide agent.

8. A thermoplastic resin composition according to claim 7 in which the carbodiimide constitutes 0.5-8 weight % and is of the formula $R_1-N=C=N-R_2$ in which $R_1$ and $R_2$ are alicyclic or aliphatic.

9. A thermoplastic resin composition according to claim 8 in which the carbodiimide constitutes 1 to 5 weight % and $R_1$ and $R_2$ are cyclohexyl.

10. A carbon fiber composition consisting essentially of a carbon fiber and 0.001-8% carbodiimide agent adhering to the surface above said carbon fiber.

11. A carbon fiber composition according to claim 10 in which the carbodiimide agent of the formula $R_1-N=C=N-R_2$ in which $R_1$ and $R_2$ are alicyclic or aliphatic.

12. A carbon fiber composition according to claim 10 in which the amount of carbodiimide is 0.1-7 weight %.

13. A prepreg comprising a carbon fiber composition according to claim 10 and a thermoplastic resin in an amount of 0.1-10 weight % impregnating said carbon fiber composition.

14. A prepreg according to claim 13 in which the thermoplastic resin is a polycarbonate.

15. A carbon fiber composition according to claim 4 in which said mixture consists essentially of a polycarbonate thermoplastic resin and between 0.01-10 weight % of a carbodiimide agent.

* * * * *